W. J. WEBBER.
Animal-Trap.

No. 227,935. Patented May 25, 1880.

Witnesses
Frank A. Brooks
J. F. Rouse

Inventor
Winford J. Webber
By Dewey & Co.
Attys

UNITED STATES PATENT OFFICE.

WINFORD J. WEBBER, OF HOLLISTER, CALIFORNIA.

ANIMAL-TRAP.

SPECIFICATION forming part of Letters Patent No. 227,935, dated May 25, 1880.

Application filed February 24, 1880.

*To all whom it may concern:*

Be it known that I, WINFORD J. WEBBER, of Hollister, county of San Benito, and State of California, have invented an Improved Trap; and I hereby declare the following to be a full, clear, and exact description thereof.

My invention relates to certain improvements in traps which are intended for the capture of animals, birds, &c.; and it consists in the employment of one or more needles or sharpened spears, moving in guides and provided with an elastic spring, by which the needle is forced forward when released by the action of a trigger. This trigger is operated by the attempt of the animal to pass its free end, and this end is concealed by a stalk, weed, or any natural object. In combination with these devices I employ a guard or protector, to be used while the trap is being set or carried about, as will be more fully described by reference to the accompanying drawings, in which—

Figure 1:
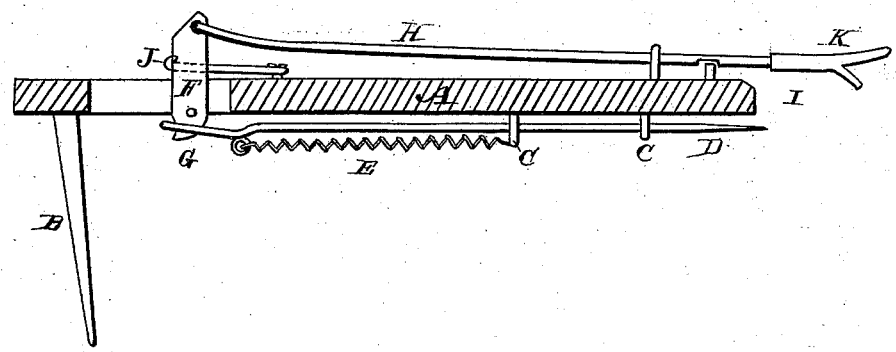
Figure 2:
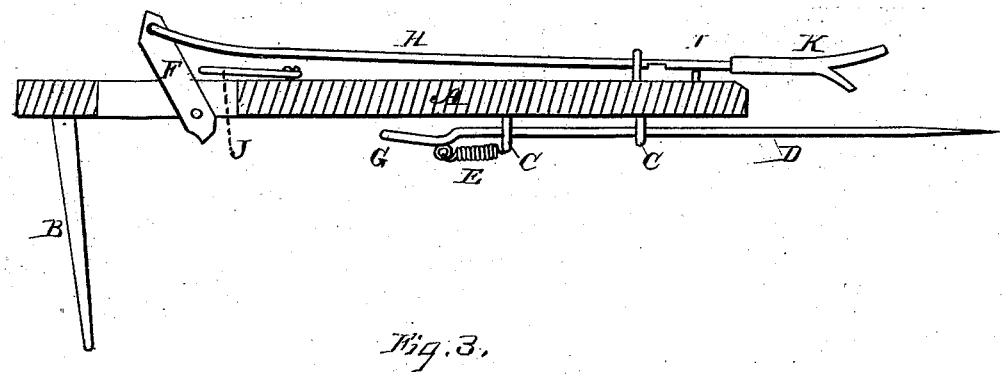
Figure 3:
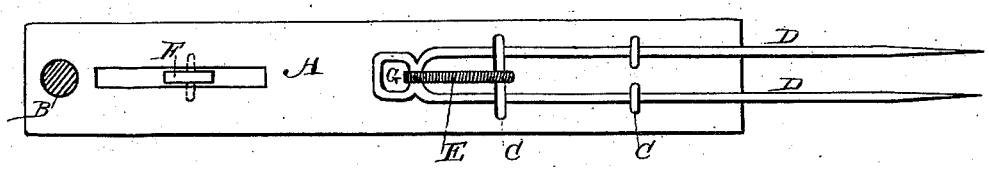

Figure 1 is a view of my trap set. Fig. 2 is a view of the trap unset. Fig. 3 is a bottom view.

A is a bar, which serves as a support for the needles, trigger, and other parts of the trap. This bar has a pin or leg, B, which is long enough to be pressed into the ground, and thus hold the trap in place. Beneath the bar, and near the end opposite to the peg, are guides C, through which the needle or needles D slide.

If one needle is used it will be provided with a loop or connection for the impelling-spring; and if two or more be used they can be united by a cross-piece, so as to act together.

In the present case I have shown a rubber spring, E; but a spiral, flat, or other impelling-spring may be used, if desired, so that when the needles are drawn back and the trap set the tension of the spring will be sufficient to throw the needles forward with great force.

A trigger, F, has its fulcrum in the bar A, and its ends project above and below the bar. The lower end has a slight notch at the back, upon which the loop G of the needles may be hooked when the needles are drawn back.

From the upper end of the trigger a rod, H, extends forward above the bar, so that its end projects a short distance beyond the end of the bar. A notch is made in the lower side of this rod, and this notch hooks upon a catch, I, near the end of the bar A, as shown, when the needles are drawn back and connected with the trigger, thus setting the trap.

A stout wire, J, is bent so as to stand behind the trigger, and thus prevent the trap from being accidentally sprung while setting or while it is being carried from place to place.

The front end or extension of the rod H is adapted to receive a stalk, K, of mustard, straw, weed, corn-cob, or any natural production of the territory where the trap is to be used. The object of this is to provide a natural object, which extends across the hole of the animal when the trap is in position, and which will not excite suspicion. The animal, while attempting to push it out of the way or to pass it, unlatches the rod H, and thus releases the trigger, and the needles will be impelled forward, so as to impale the animal.

The stalk or weed is an important attachment, since many animals, such as gophers, ground-squirrels, and others, are very suspicious, and if their holes are obstructed by any ordinary trap they will not come near it.

In setting my trap the bar A is placed in such a position that the stalk K will lie across and obstruct the hole. The leg B is then pressed into the ground, so as to hold the trap firmly to its place.

The end of the bar A is entirely at one side of the hole. The needles D are concealed beneath the bar, while the stalk K lies across the mouth of the hole in a natural position.

When the animal attempts to pass the obstruction or push it out of the way he will free the trigger and release the needles, by which he will be impaled.

Having thus described my invention, what I claim as new, and desire to secure by Letters Patent, is—

The bar A, with its guides C, and the needles D, with their impelling-spring below the bar, in combination with the trigger F, the notched setting-rod H, and the catch I, substantially as and for the purpose herein described.

In witness whereof I have hereunto set my hand.

WINFORD JAMES WEBBER.

Witnesses:
 WM. G. LEE,
 E. W. FAIRCHILD.